(12) United States Patent
Ricker et al.

(10) Patent No.: US 11,051,051 B1
(45) Date of Patent: Jun. 29, 2021

(54) SYSTEMS, METHODS, AND DEVICES FOR MANAGING STORAGE OF MEDIA OBJECTS

(71) Applicant: Synamedia Limited, Staines Upon Thames (GB)

(72) Inventors: Clint Earl Ricker, Lawrenceville, GA (US); Samie Beheydt, Geluwe (BE)

(73) Assignee: Synamedia Limited, Middlesex (GB)

( * ) Notice: Subject to any disclaimer, the term of this patent is extended or adjusted under 35 U.S.C. 154(b) by 0 days.

(21) Appl. No.: 16/832,362

(22) Filed: Mar. 27, 2020

(51) Int. Cl.
*H04N 21/231* (2011.01)
*H04N 21/4335* (2011.01)
*H04N 21/4147* (2011.01)

(52) U.S. Cl.
CPC ....... *H04N 21/231* (2013.01); *H04N 21/4147* (2013.01); *H04N 21/4335* (2013.01)

(58) Field of Classification Search
CPC ............. H04N 21/231; H04N 21/4147; H04N 21/4335; H04N 21/26258; H04N 9/8205; G06F 16/13; G06F 16/48; G06F 3/0611; G06F 3/0685; G06F 3/1454; G11B 17/228; H04L 65/4061; H04L 67/1095
See application file for complete search history.

(56) References Cited

U.S. PATENT DOCUMENTS

| | | | | |
|---|---|---|---|---|
| 2002/0108115 A1* | 8/2002 | Palmer | ............. | H04N 21/26258 725/50 |
| 2008/0178198 A1* | 7/2008 | Gauba | ..................... | G06F 16/13 719/320 |
| 2009/0113302 A1* | 4/2009 | Cho | ..................... | G11B 17/228 715/716 |
| 2009/0248713 A1* | 10/2009 | Park | ..................... | H04L 67/1095 |
| 2011/0295775 A1* | 12/2011 | Wang | ..................... | G06F 16/48 706/12 |
| 2013/0170815 A1* | 7/2013 | Coskun | ................ | H04N 9/8205 386/230 |
| 2018/0074681 A1* | 3/2018 | Roos | ..................... | G06F 3/1454 |
| 2019/0197144 A1* | 6/2019 | Ngo | ..................... | G06F 3/0685 |
| 2020/0026427 A1* | 1/2020 | Peleg | ..................... | G06F 3/0611 |
| 2020/0236165 A1* | 7/2020 | Stolcenburg | ........ | H04L 65/4061 |

\* cited by examiner

*Primary Examiner* — Le H Luu
(74) *Attorney, Agent, or Firm* — Fernando & Partners, LLP

(57) ABSTRACT

A method includes storing a first plurality of media objects correspondingly associated with a plurality of metadata objects, each media object including a respective plurality of sequential media segments. The method includes receiving a recording request that is associated with a first one of the first plurality of media objects, and, responsive thereto, updating a metadata object corresponding to the first one of the first plurality of media objects to indicate the recording request. The method includes identifying a portion of the first plurality of media objects, not including the first one of the plurality of metadata objects, that satisfies a deletion criterion. The method includes removing the portion of the first plurality of media objects while maintaining the first one of the first plurality of media objects. The method includes storing a second plurality of media objects and the first one of the first plurality of media objects.

20 Claims, 7 Drawing Sheets

SYSTEMS, METHODS, AND DEVICES FOR MANAGING STORAGE OF MEDIA OBJECTS

TECHNICAL FIELD

The present disclosure relates to storage systems, and, in particular, to enabling more efficient management of storage of media objects.

BACKGROUND

Cloud-enabled/network-based digital video recording (cDVR) facilitates media content recording and delivery (e.g., playback). Media content is often stored as a file, sometimes referred to as a media object. The media object corresponds to a complete recording, such as an entire episode of a television show. Typically, a media object includes a number of discrete media segments.

A conventional cDVR system typically includes multiple, distinct storage systems for storing media objects. For example, a first storage system includes a rolling buffer that stores media objects as they become available, independent of recording requests. A second storage system stores a media object in response to receiving a request to record the media object. Accordingly, by using distinct storage systems in order to manage the storage of media objects, conventional cDVR systems are cumbersome and resource (e.g., storage and processing) intensive. Moreover, storing media objects across multiple storage systems utilizes a large amount of metadata, further increasing storage and processing utilization.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
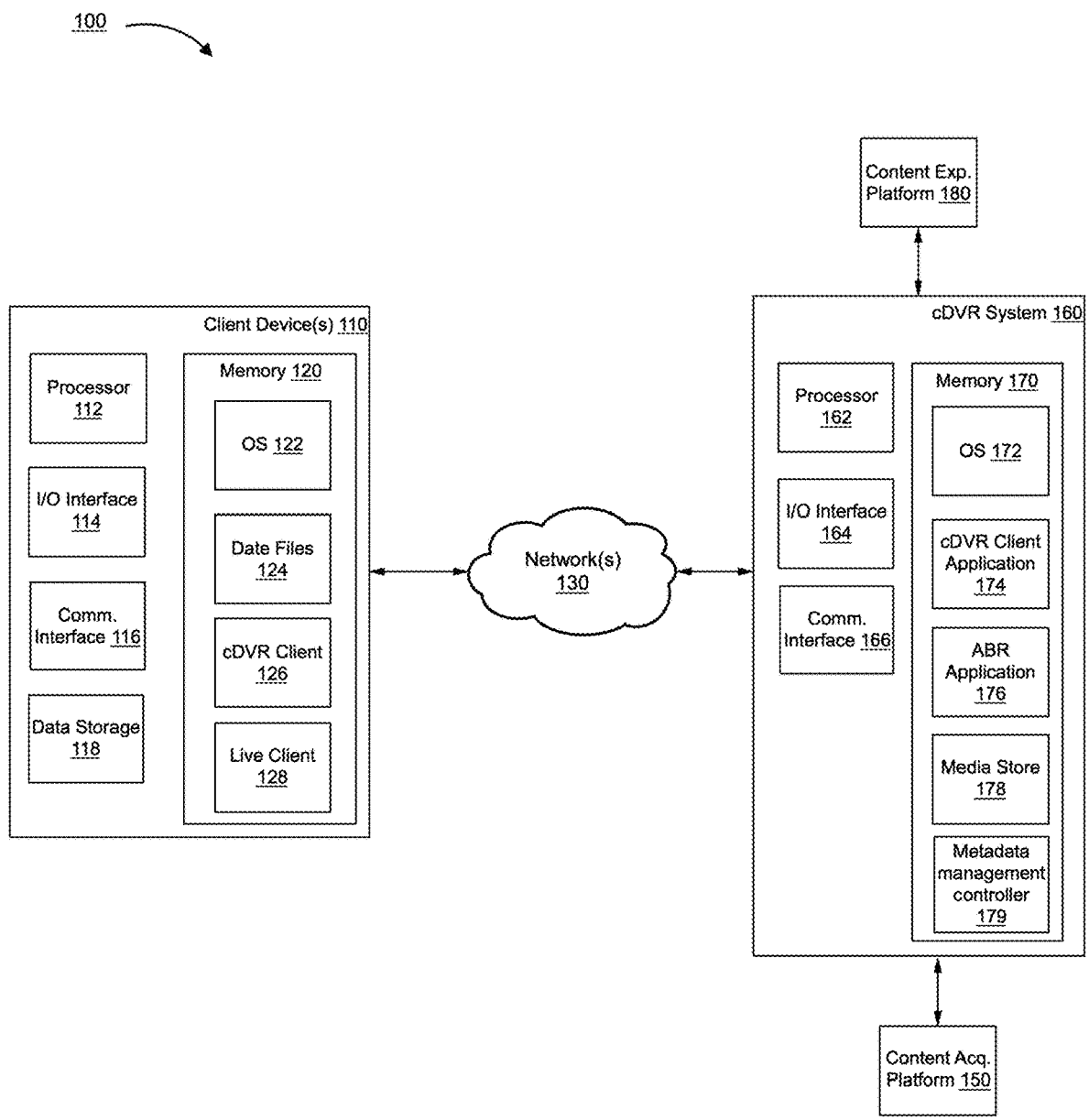
FIG. 1 is a block diagram of a cloud-based digital video recording (cDVR) operating environment.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for managing storage of media objects in a more efficient manner are disclosed herein. Namely, various methods, systems (e.g., cDVR systems), and apparatuses include removing a portion of stored media objects that are not associated with a recording request, while maintaining within memory another portion of the stored media objects that are associated with the recording request.

In accordance with some embodiments, a method is performed at an electronic device with one or more processors and a non-transitory memory, such as at a cDVR system (e.g., storage and playback system). The method includes storing, in a memory, a first plurality of media objects. Each of the first plurality of media objects includes a respective plurality of sequential media segments. The first plurality of media objects is correspondingly associated with a plurality of metadata objects. The method includes receiving a first recording request that is associated with a first one of the first plurality of media objects. The method includes updating a first one of the plurality of metadata objects corresponding to the first one of the first plurality of media objects in response to receiving the first recording request, and in order to include an indication of the first recording request. The method includes identifying, based on the plurality of metadata objects, a portion of the first plurality of media objects that satisfies a deletion criterion. The first one of the plurality of metadata objects does not satisfy the deletion criterion based on the first recording request. The method includes removing, from the memory, the portion of the first plurality of media objects while maintaining the first one of the first plurality of media objects. The method includes adding, to the memory, a second plurality of media objects for storage along with the first one of the first plurality of media objects.

In accordance with some embodiments, an electronic device includes one or more processors and a non-transitory memory. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device, cause the device to perform or cause performance of the operations of any of the methods described herein. In accordance with some embodiments, an electronic device includes means for performing or causing performance of the operations of any of the methods described herein. In accordance with some embodiments, an information processing apparatus, for use in an electronic device, includes means for performing or causing performance of the operations of any of the methods described herein.

A cDVR system typically includes two distinct storage systems for storing media objects, such as is described with reference to FIG. 2. The first storage system includes a rolling buffer that stores media objects as they become available, independent of recording requests. The rolling buffer is a first in first out (FIFO) that stores a media object for a predetermined amount of time. A media object is deleted a predetermined amount of time after entering the rolling buffer. The second storage system stores a media object in response to receiving a request to record the media object. Thus, the second storage system stores media objects based on receiving associated recording requests. Accordingly, by using two distinct storage systems in order to manage the storage of media objects, some cDVR systems are cumbersome and resource (e.g., storage and processing) intensive. Moreover, storing media objects across the first and second storage systems utilizes a large amount of metadata, further increasing storage and processing utilization. For example, a cDVR system may store relational information including metadata associated with discrete media segments, and metadata indicating a mapping between the discrete media segments and recordings requests. Due to the relatively large amount of relational information, managing the relational information is computationally expensive and storing the relational information requires a large storage capacity. As another example, some cDVR systems reduce metadata storage by converting certain stored media objects into corresponding assets, such as converting an older stored media object into a video on demand (VOD) asset. However, these cDVR systems do not support retroactive recording and require additional computational resources for the conversion process.

FIG. 1 is a block diagram of a cloud-based digital video recording (cDVR) operating environment 100. Briefly, a content acquisition platform (CAP) 150 can communicate with a cDVR system 160, which includes a media store 178 for storing media content, such as a television show. The cDVR system 160 often stores media content as a media object that corresponds to a complete recording, such as an entire episode of a television show. Typically, a media object includes a number of discrete media segments. One or more client devices 110 can communicate over one or more networks 130 with the cDVR system 160.

The CAP 150 includes one or more computing devices that provide content streaming (real-time and/or non-real-time content delivery), the delivery of stored and/or recorded discrete media segments, or the like. Additionally, the CAP 150 acquires and transcodes discrete media segments and optionally protects and encrypts the discrete media segments. The cDVR system 160 may include one or more edge servers, one or more routers and/or bridges, one or more data center servers, one or more content databases, and/or one or more content servers. The various elements of the cDVR system 160 can cooperate to receive discrete media segments from the CAP 150 and appropriately cache the discrete media segments for access by the one or more client devices 110.

In order to facilitate management (e.g., recording, playback, and deletion) of discrete media segments, the cDVR system 160 includes a metadata management controller 179. The metadata management controller 179 performs sequencing with respect to a plurality of discrete media segments based on a corresponding plurality of metadata files. Each metadata file describes a corresponding discrete media segment and each metadata file is stored on the cDVR system 160. For example, in order to store five discrete media segments of a media object (e.g., the first 10 seconds of a television show), the metadata management controller 179 performs five sequencing operations on the five discrete media segments. For each of the five sequencing operations, the metadata management controller 179 processes a corresponding metadata file.

The cDVR system 160 includes one or more processors 162, one or more memories 170, one or more input/output (I/O) interfaces 164, and one or more communication interfaces 166. The one or more processors 162 can individually comprise one or more cores and can be configured to access and execute, at least in part, instructions stored in the one or more memories 170. The one or more memories 170 include one or more non-transitory computer readable storage media (CRSM). The one or more memories 170 can include, but are not limited to, random access memory (RAM), flash RAM, magnetic media, optical media, and so forth. The one or more memories 170 can be volatile in that information is retained while providing power or nonvolatile in that information is retained without providing power.

The one or more memories 170 store instructions for execution by the processor 162 in order to perform certain actions or functions. These instructions can include an operating system (OS) 172 configured to manage hardware resources, such as the I/O interfaces 164, and provide various services to applications executing on the processor 162. The one or more memories 170 can also store data files including information about the operating system 172.

The one or more client devices 110 communicate over one or more networks 130 with the cDVR system 160. The one or more client devices 110 include, but are not limited to, a set top-box (STB), smartphones, laptop computers, tablets, electronic book reading devices, processor-based devices, or the like. The one or more client devices 110 communicate with the cDVR system 160 over the one or more types of networks 130, such as a Wi-Fi network, a Wi-Fi Direct network, BLUETOOH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The one or more client devices 110 each include one or more processors 112, one or more memories 120, data storage 118, one or more input/output (I/O) interfaces 114, and one or more communication interfaces 116. The one or more processors 112 can individually comprise one or more cores and can be configured to access and execute, at least in part, instructions stored in the one or more memories 120. The one or more memories 120 include one or more non-transitory computer readable storage media (CRSM). The one or more memories 120 can include, but are not limited to, random access memory (RAM), flash RAM, magnetic media, optical media, and so forth. The one or more memories 120 can be volatile in that information is retained while providing power or nonvolatile in that information is retained without providing power.

The one or more communication interfaces 116 provide for the transfer of data between the client device 110 and another device directly, via a network, or both. The communication interfaces 116 can include, but are not limited to, personal area networks (PANs), wired local area networks (LANs), wireless local area networks (WLANs), wireless wide area networks (WWANs), and so forth. The one or more communication interfaces 116 can utilize acoustic, radio frequency, optical, or other signals to exchange data between the one or more client devices 110 and another device such as an access point, a host computer, a router, an e-reader device, another one of the one or more client devices 110, and the like.

The one or more memories 120 store instructions for execution by the processor 112 in order to perform certain actions or functions. These instructions can include an operating system (OS) 122 configured to manage hardware resources, such as the I/O interfaces 114, and provide various services to applications executing on the processor 112. The one or more memories 120 can also store data files 124 including information about the operating system 122.

The one or more memories 120 store a cDVR client 126. The cDVR client 126 can receive or access information associated with the cDVR operating environment 100. The cDVR client 126 can communicate over the one or more networks 130 with the cDVR system 160. The memory 120 stores manifest data accessible to the cDVR client 126, where the manifest data is provided to enable the client device 110 to specify media segments when requesting a recorded media segment.

The one or more memories 120 store a live client 128. The live client 128 can receive information collected or generated by the cDVR client 126. The live client 128 can be in communication over one or more networks 130 with the cDVR system 160.

The one or more memories 170 store a cDVR client application 174. The cDVR client application 174 can receive requests from one or more client devices 110, schedule recordings, perform validation checks, perform quality control checks, and perform other cDVR functionality. The cDVR client application 174 communicates over the one or more networks 130 with the one or more client devices 110 or other devices in the cDVR operating environment 100.

The one or more memories 170 store an adaptive bit-rate (ABR) application 176. The ABR application 176 can receive information associated with the network connection quality and/or the client device 110 to determine an adaptive bit-rate associated with the client device 110. The ABR application 176 can determine an optimal set of bitrates associated with a particular device class associated with the client device 110 based at least in part on the information associated with the client device 110, the information associated with the network connection quality of the client device 110, the received request from the client device 110, and/or a user account profile associated with the client device 110.

The cDVR system 160 is in communication with the content experience platform (CEP) 180. The CEP 180 can provide guide data (e.g., linear video metadata management), include application interface servers (e.g., API servers or "app servers" for linear and on-demand services), and/or provide a content and service protection platform (e.g., a combination of privacy, network security, conditional access, and content protection of digital rights components). For example, the CEP 180 communicates to the cDVR system 160 that a unique-copy modality is required, and thus the cDVR system 160 stores, for a particular media object, a unique copy of distinct media segments on a per client device basis or on a per subscriber (e.g., per user account) basis.

The cDVR system 160 manages source data, which can describe where the source is located, and any information that can be requested by a user in association with the distinct media segment (e.g., rating information for the distinct media segment, duration of the distinct media segment, date the distinct media segment was recorded, and the like). For example, the cDVR system 160 stores the current segment duration for each of one or more sources. Other characteristics can also be stored in association with the distinct media segment. The cDVR system 160 can store information indicating whether to store a segment in a manner so that a user can receive a copy of the segment or if a segment can be shared by multiple users.

The cDVR client 126 generates and transmits a request to the cDVR client application 174 for a list of distinct media segment associated with the user account associated with the client device 110. The cDVR client application 174 can retrieve or otherwise obtain information other components within the cDVR system 160 and generate a list of all distinct media segment associated with the user account and metadata associated with the distinct media segment. For example, the metadata can include, but is not limited to, availability of the distinct media segment, quota information associated with the distinct media segment, or the like. The list of the distinct media segment associated with a user account, recording state, and quota information can be compiled and transmitted to the cDVR client 126 of a client device 110.

Figure 2:
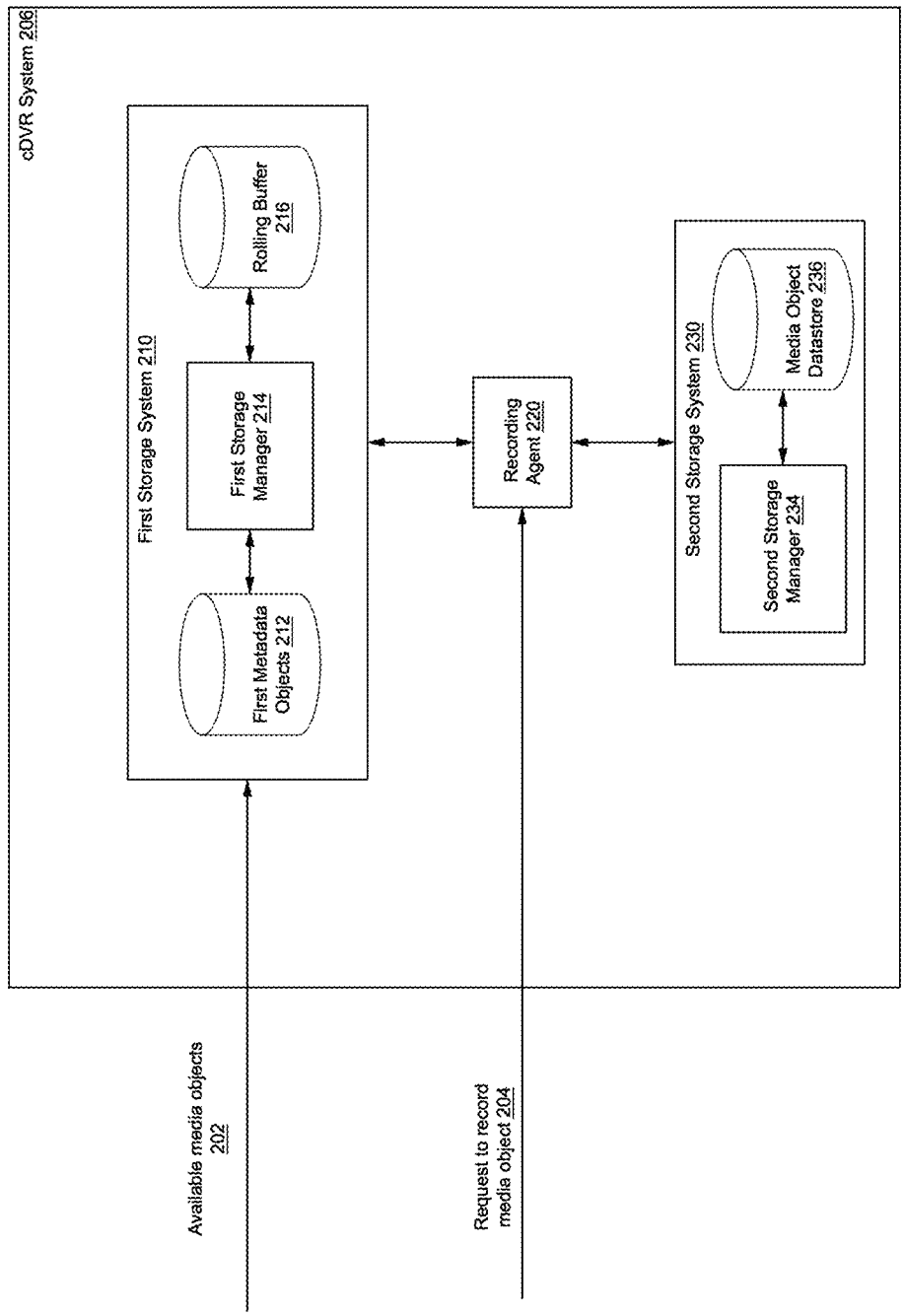
FIG. 2 is a block diagram of a cDVR system that includes multiple storage systems for managing storage of media objects.

FIG. 2 is a block diagram of a cDVR system 206 that includes multiple storage systems for managing storage of media objects. Namely, the cDVR system 206 includes a first storage system 210 for storing available media objects 202 in a rolling buffer 216 (e.g., a FIFO), independent of receiving recording requests. For example, the available media objects 202 correspond to media objects that are being live broadcasted (e.g., a live television channel). Moreover, the cDVR system 206 includes a second storage system 230 that stores, in a media object datastore 236, a media object 204 in response to receiving a request to record the media object 204.

The first storage system 210 includes a first metadata objects datastore 212 that stores metadata objects associated with the available media objects 202. For example, each metadata object describes a corresponding media object, such as how media segments included in the corresponding media object are related to each other.

The first storage system 210 includes a first storage manager 214 that stores the available media objects 202 based on a function of corresponding metadata objects. For example, the first storage manager 214 assembles (e.g., sequences) the available media objects 202 as they are received, and provides the assembled available media objects 202 in the rolling buffer 216 for storage. Due to a steady stream of incoming available media objects 202, the first storage manager 214 is constantly overwriting previously stored (in the rolling buffer 216) portions of media objects. Accordingly, the cDVR system 206 includes the second storage system 230 in order to store the media object 204, which is associated with a recording request, that the first storage manager 214 has stored but will remove via overwriting.

To that end, the cDVR system 206 includes a recording agent 220 that obtains the media object 204 from the rolling buffer 216 based on the recording request. For example, the recording agent 220 provides the request to the first storage system 210. Based on metadata included in the request (e.g., segment identifiers, recording identifier, source identifier), the first storage system 210 retrieves the media object 204 from the rolling buffer 216 and provides the media object 204 back to the recording agent 220, which itself provides the media object 204 to the second storage manager 234. The second storage manager 214 stores the media object 204 in a media object datastore 236 so that the media object 204 can be later played back.

However, as described above, the cDVR system 206 is cumbersome and resource (e.g., storage and processing) intensive. For example, the storage requirements of the cDVR system 206 are relatively high due to having two separate storage systems 210 and 230. Moreover, the cDVR system 206 utilize large amounts of processing and storage resources in transferring media objects between the first storage system 210 and the second storage system 230 in response to recording requests.

Example Embodiments

Reference will now be made to embodiments that provide improvements in storage and processing utilization, as compared with the cDVR system 206. Examples of the embodiments are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In contrast to the cDVR system 206 including multiple distinct storage systems as described with reference to FIG. 2, various embodiments disclosed herein include methods, cDVR systems, and apparatuses including a single storage system. To that end, various embodiments disclosed herein include a cDVR system (e.g., the cDVR system 306 in FIG. 3) configured to selectively remove a portion of stored media objects that are not associated with a recording request, and maintain within memory another portion of the media objects that are associated with the recording request. To that end, the cDVR system updates (e.g., marks) a metadata object associated with a particular media object in order to include an indication of the recording request. Accordingly, during a removal operation, the cDVR system maintains storage of the particular media object based on the updated metadata object. In some implementations, the cDVR system stores media objects in a rolling buffer (e.g., a linear buffer or circular buffer), and updates storage within the rolling buffer based on receiving various recording requests. Accordingly, the cDVR system maintains storage of desired media objects (or portions thereof) without having to maintain a secondary storage system for storing older media objects, thereby reducing storage and processor utilization. Moreover, in some implementations, the cDVR system may store metadata objects in association with other (e.g., concatenating, merging, appending), thereby further reducing storage and processor utilization.

Figure 3:
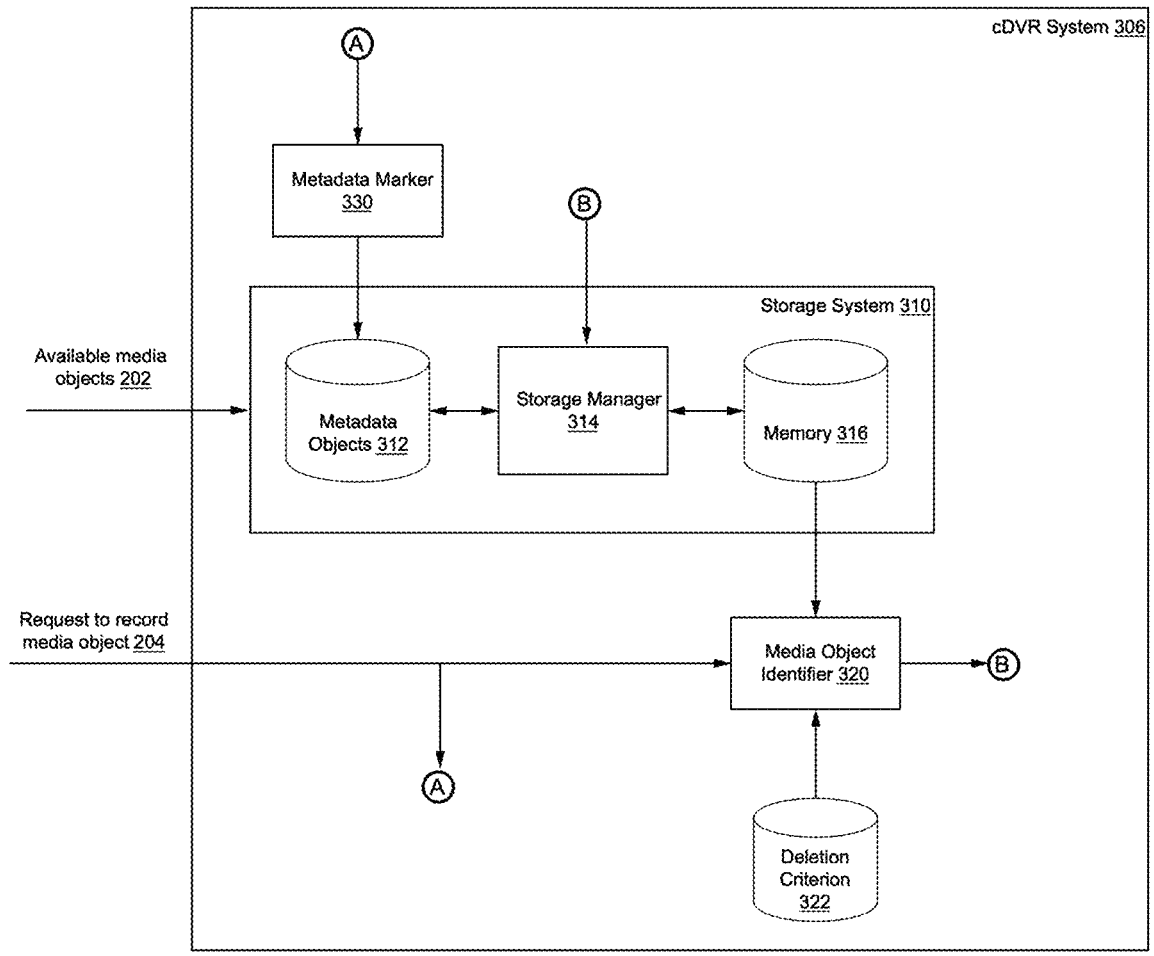
FIG. 3 is an example of a block diagram of a cDVR system for managing storage of media objects in accordance with some embodiments.

FIG. 3 is an example of a block diagram of a cDVR system 306 for managing storage of media objects in accordance with some embodiments. In contrast to the cDVR system 206 described with reference to FIG. 2, the cDVR system 306 includes a single storage system 310 that stores available media objects 202 and stores a media object 204 associated with a recording request. In some embodiments, a particular source (e.g., television channel) provides the available media objects 202 to the cDVR system 306, and the request to record the media object 204 is associated with a particular source identifier identifying the particular source.

The storage system 310 includes a metadata objects datastore 312 that stores metadata objects associated with the available media objects 202. In some embodiments, a metadata object provides an indication of temporal relationships between sequential media segments included in a corresponding media object. For example, each metadata object describes a corresponding media object, such as describing how sequential media segments included in the corresponding media object are related to each other. In some embodiments, a metadata object corresponds to an XML object, such as an MPEG-DASH media presentation description (MPD) object. In some embodiments, a metadata object corresponds to an HTTP live streaming (HLS) object. In some embodiments, a metadata object corresponds to an HTTP Smooth Streaming (HSS) object.

The storage system 310 includes a storage manager 314 that provides the available media objects 202 to a memory 316 for storage, based on a function of corresponding metadata objects. For example, the storage manager 314 assembles (e.g., sequences) the available media objects 202 as they are received, and provides the assembled available media objects 202 to the memory 316 for storage. In some embodiments, the memory 316 correspond to a rolling buffer (e.g., a FIFO or circular buffer). In some embodiments, the storage manager 314 overwrites older portions of media objects with the available media objects 202 as the available media objects 202 are received by the cDVR system 306.

The cDVR system 306 receives a request to record a media object 204. For example, the request is requested from a logical client, such as a head-end device that services a plurality of subscribers (e.g., a plurality of user profiles). The request includes metadata that describes the media object 204, such as segment identifiers identifying a plurality of sequential segments included in the media object 204, a recording identifier (e.g., a particular user profile), start/stop times, source identifier (e.g., a particular television channel associated with the media object 204), and/or the like.

The cDVR system 306 includes a metadata marker 330 that obtains the request to record the media object 204. Based on the metadata included in the request, the metadata marker 330 updates (e.g., marks) a metadata object, which is currently stored in the metadata objects store 312, and that is associated with the media object 204. For example, with reference to FIG. 4, the request to record 420 is associated with a "Cooking Show" media object, and thus the metadata marker 330 updates a metadata object corresponding to the "Cooking Show" in order to indicate the recording request. As one example, the metadata marker 330 adds a "do not remove" designation to the corresponding metadata object.

The cDVR system 306 includes a media object identifier 320 that identifies a portion of the currently stored media objects in the memory 316 that satisfies a deletion criterion. In some embodiments, the deletion criterion is stored in a deletion criterion datastore 322. Because the media object 204 is associated with the request to record, the media object 204 does not satisfy the deletion criterion. For example, with reference to FIG. 4, in response to receiving the request 420 to record the "Cooking Show" media object, the cDVR system 306 identifies a 3:55-4:00 portion of the "Kids Show" media object as satisfying the deletion criterion because (a) the 3:55-4:00 portion of the "Kids Show" media object is the oldest stored item (e.g., first in) and (b) the cDVR system has not received a recording request associated with the 3:55-4:00 portion of the "Kids Show" media object. Continuing with this example, in response to receiving the request 420 to record the "Cooking Show" media object, the cDVR system 306 identifies the entire 5:00-5:30 "Sitcom XYZ" media object as satisfying the deletion criterion because the cDVR system has not received a recording request associated with the 5:00-5:30 "Sitcom XYZ" media object.

The media object identifier 320 provides the identified portion of the currently stored media objects to the storage manager 314. The storage manager 314 removes, from the memory 316, the portion of the currently stored media objects while maintaining storage of the media object 204 associated with the recording request. Moreover, the storage manager 314 adds available media objects 202 to the memory 316 along with the media object 204, such as by overwriting the removed portion of the currently stored media objects with newly available media objects 202.

Figure 4:
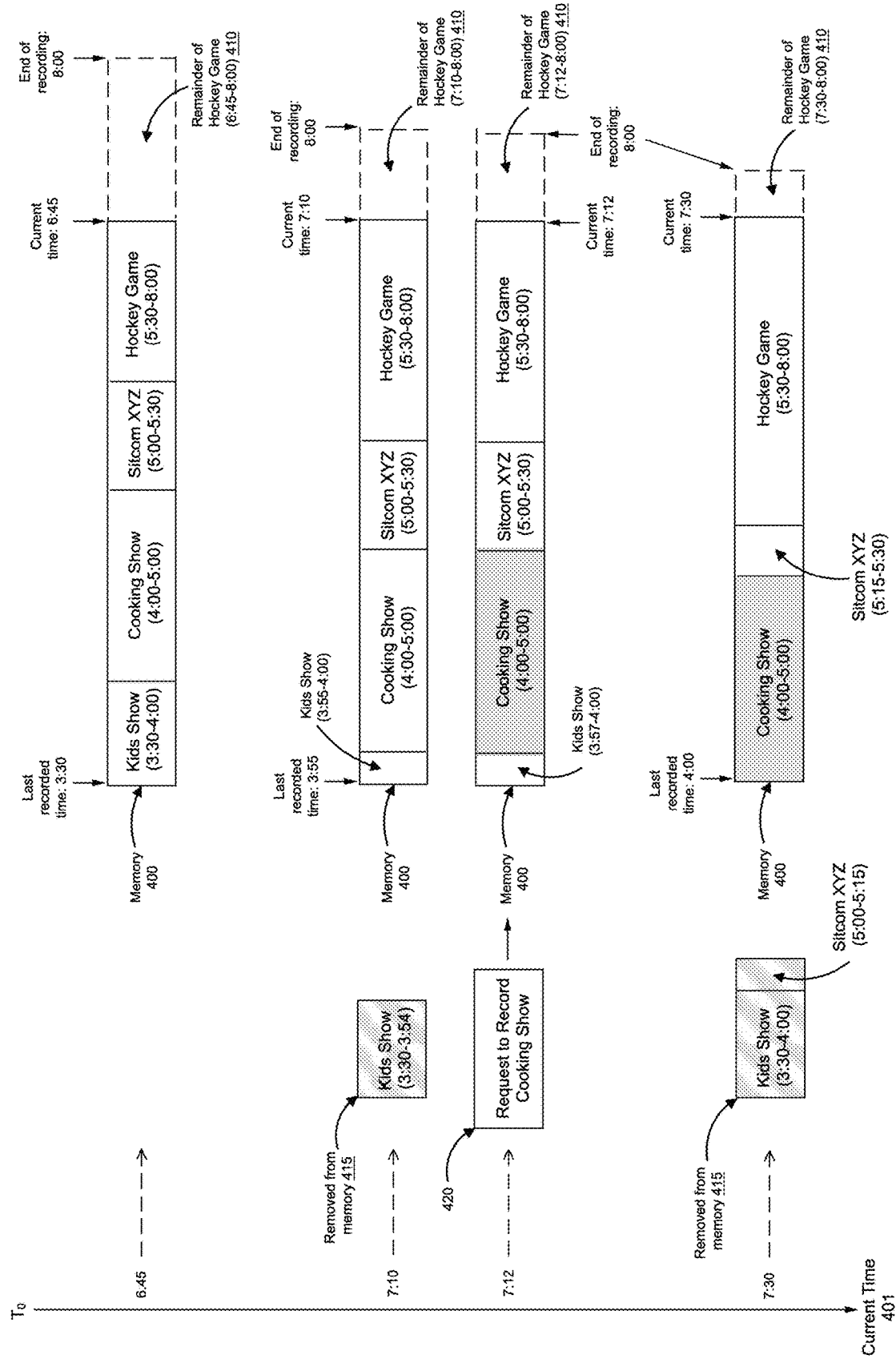
FIG. 4 is an example of a timeline representation for managing storage of media objects in accordance with some embodiments.

FIG. 4 is an example of a timeline representation for managing storage of media objects in accordance with some embodiments. In some implementations, the technique described below with reference to FIG. 4 is implemented by the cDVR system 306 illustrated in FIG. 3. Briefly, as illustrated in FIG. 4, a cDVR system stores television programs (e.g., media objects) as they become available and removes certain television programs that are not associated with respective recording requests. The cDVR system stores the television programs in a memory 400, which may be a rolling buffer. As illustrated in FIG. 4, a current time indicator 401 indicates the passage of time, starting at an initial time $T_0$.

At time 6:45, the memory 400 includes an entire 3:30-4:00 "Kids Show" media object, an entire 4:00-5:00 "Cooking Show" media object, an entire 5:00-5:30 "Sitcom XYZ" media object, and a portion of a 5:30-8:00 "Hockey Game" media object including the "Hockey Game" media object from 5:30-6:45. The remainder 410 of the "Hockey Game" media object is unavailable (e.g., not yet broadcast) and thus not yet stored in the memory 400. In some embodiments, the memory 400 is a FIFO, and because the "Kids Show" media object is the first in media object, the "Kids Show" media object is also the first out (first to be removed) media object of the memory 400.

At time 7:10, an additional 25 minutes of media content of the "Hockey Game" is available to be stored, as compared with time 6:45. Accordingly, in order to make room to store the additional media content, the cDVR system removes, from the memory 400, 25 minutes of the "Kids Show" media object, as is indicated by a removed from memory indicator 415 in FIG. 4. Accordingly, at time 7:10, the memory 400 includes the last 5 minutes of the "Kids Show" media object, corresponding to 3:55-4:00 of the same. Moreover, at time 7:10, the memory 400 includes the "Hockey Game" media object from 5:30-7:10.

At time 7:12, the cDVR system receives a request 420 to record the "Cooking Show" media object. For example, with reference to FIG. 3, the cDVR system 306 receives the request to record the media object 204. In response to receiving the request 420, the cDVR system updates metadata associated with the "Cooking Show" media object, as is indicated by the highlighting of the "Cooking Show" media object stored in the memory 400 at time 7:12. For example, with reference to FIG. 3, the metadata marker 330 updates, in the metadata objects datastore 312, a metadata object corresponding to the "Cooking Show" media object.

At time 7:12, the memory 400 includes the last 3 minutes of the "Kids Show" media object, corresponding to 3:57-4:00 of the same.

At time 7:30, as compared with time 7:12, an additional 18 minutes of media content of the "Hockey Game" media object is available to be stored, which corresponds to 7:12-7:30 of the same. The cDVR system removes the last 3 minutes of the "Kids Show" media object corresponding to 3:57-4:00 in order to make room to store 7:12-7:15 of the "Hockey Game" media object. However, the cDVR system needs to remove an additional 15 minutes (i.e., 18 minutes−3 minutes=15 minutes) of media content in order to make room to store 7:15-7:30 of the "Hockey Game" media object. Because the cDVR system has received the request 420 to record the "Cooking Show" media object, and has correspondingly updated the metadata object, the cDVR system foregoes removing the "Cooking Show" media object. Instead, the cDVR system removes 15 minutes of the "Sitcom XYZ" media object (as indicated by the removed from memory indicator 415: 5:00-5:15), even though the "Cooking Show" is the first out media object at time 7:30. Accordingly, the cDVR system selectively removes media objects (or portions thereof) based on a recording request directed to other media objects.

Figure 5:
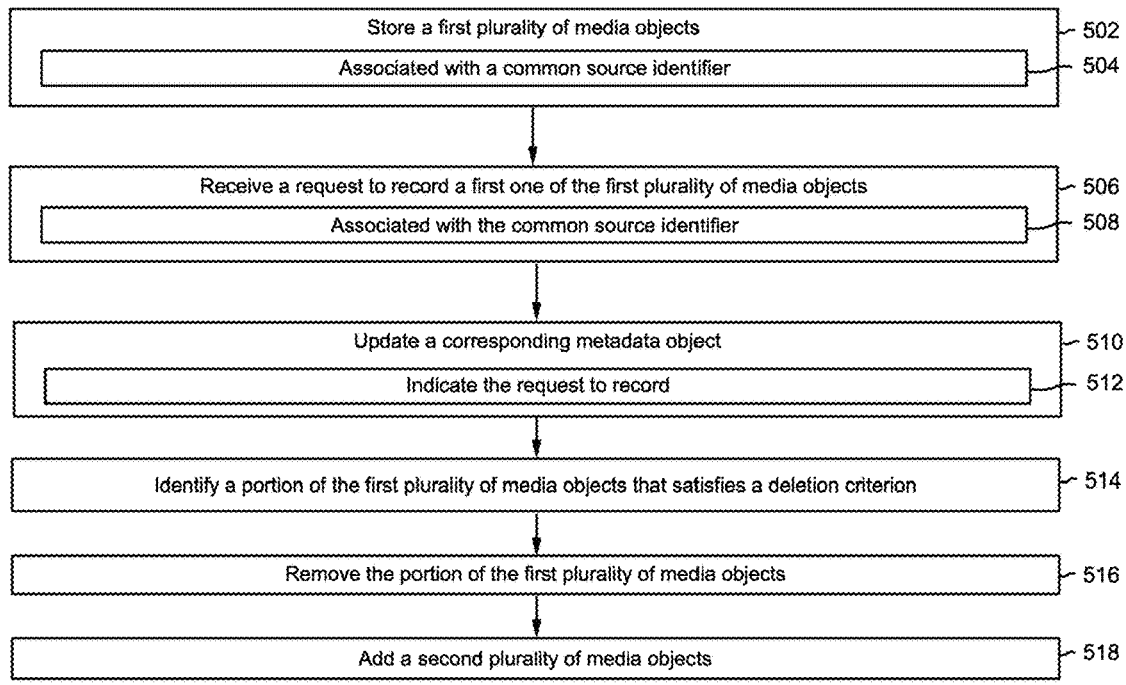
FIG. 5 is an example of a flow diagram of a method of managing storage of media objects in accordance with some embodiments.

FIG. 5 is an example of a flow diagram of a method 500 of managing storage of media objects in accordance with some embodiments. In some embodiments, the method 500 or portions thereof is performed by the cDVR system 306 in FIG. 3. In some embodiments, the method 500 or portions thereof are performed by an electronic device or an apparatus.

As represented by block 502, the method 500 includes storing, in a memory, a first plurality of media objects. Each of the first plurality of media objects includes a respective plurality of sequential media segments. The first plurality of media objects is correspondingly associated with a plurality of metadata objects. For example, a media object is a complete (e.g., entire) recording. In some embodiments, the method 500 includes storing each of the respective plurality of sequential media segments as a common copy segment. As one example, a first media object is an entire first television show, a second media object is an entire second television show, etc. In some embodiments, the memory is a buffer, such as a FIFO. In some embodiments, an application implements a FIFO pattern across the memory, which itself may or may not be a FIFO. Each of the plurality of metadata objects describes a corresponding media object, such as providing information about media segments included in the corresponding media object are related to each other. As represented by block 504, in some embodiments, the first plurality of media objects is associated with a common source identifier. For example, the common source identifier identifies a particular television channel.

As represented by block 506, the method 500 includes receiving a first recording request that is associated with a first one of the first plurality of media objects, such as the request 420 illustrated in FIG. 4. In some embodiments, the method 500 includes storing the first recording request in a first recording request log. In some embodiments, the method 500 includes receiving the first recording request from a service provider upon system startup. In some embodiments, the method 500 includes receiving the first recording request from a logical client (e.g., a head-end device) that services subscribers (e.g., user profiles). As represented by block 508, in some embodiments, the first recording request is also associated with the common source identifier.

As represented by block 510, the method 500 includes updating a first one of the plurality of metadata objects corresponding to the first one of the first plurality of media objects in response to receiving the first recording request. As represented by block 512, updating the first one of the plurality of metadata objects is in order to include an indication of the first recording request. For example, with reference to FIG. 3, the metadata marker 330 marks the first one of the plurality of metadata objects a metadata object, which is stored within the metadata objects datastore 312. In some embodiments, updating the first one of the plurality of metadata objects includes marking the first plurality of media objects as "do not delete."

As represented by block 514, the method 500 includes identifying, based on the plurality of metadata objects, a portion of the first plurality of media objects that satisfies a deletion criterion. The first one of the plurality of metadata objects does not satisfy the deletion criterion based on the first recording request. Accordingly, as represented by block 516, the method 500 includes removing, from the memory, the portion of the first plurality of media objects while maintaining the first one of the first plurality of media objects.

Moreover, as represented by block 518, the method 500 includes adding, to the memory, a second plurality of media objects for storage along with the first one of the first plurality of media objects. For example, the second plurality of media objects correspond to newly available media content. As another example, the memory has a storage capacity for one-week of media content, and the second plurality of media objects corresponds to the beginning of the subsequent week.

Figure 6:
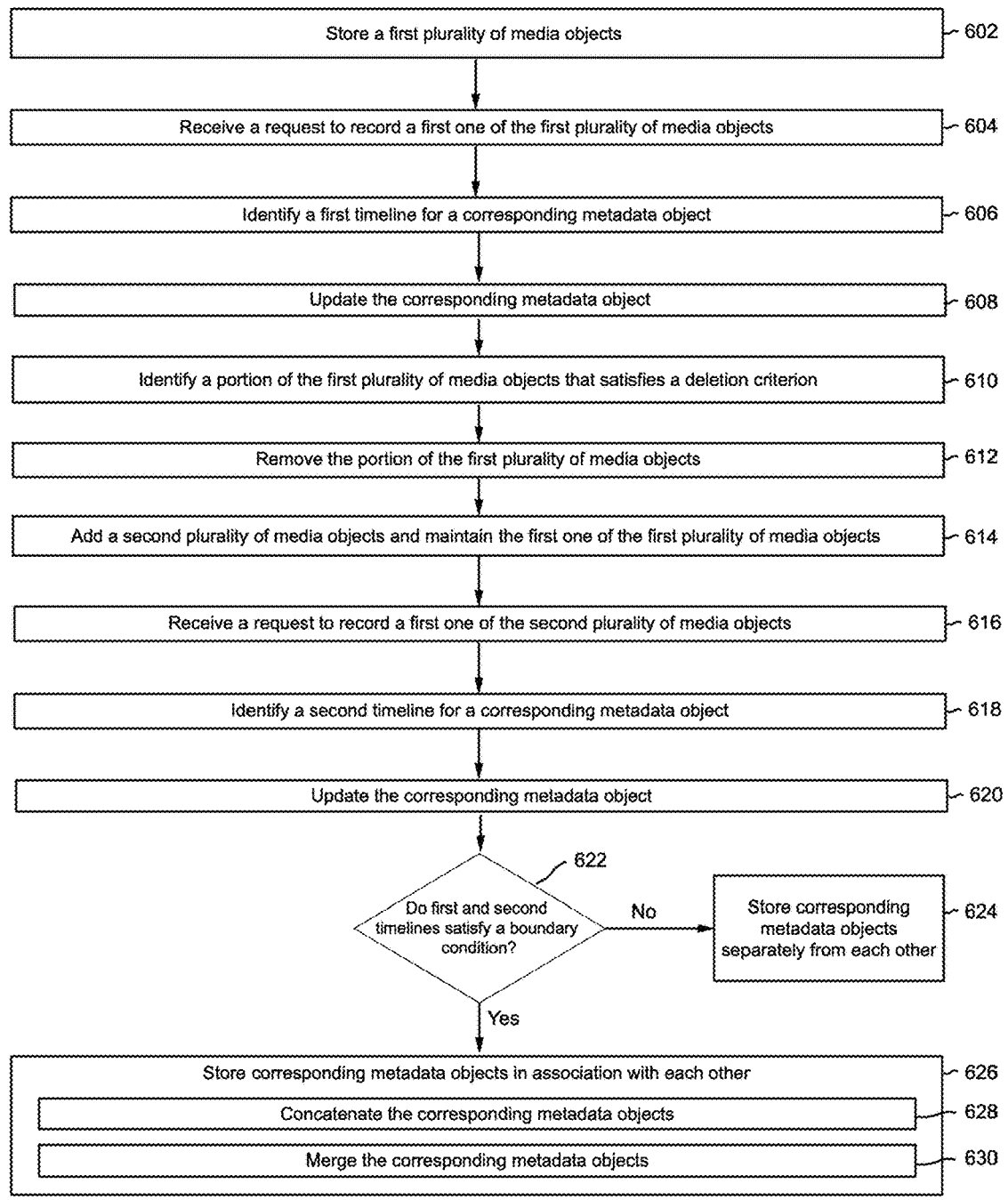
FIG. 6 is an example of a flow diagram of a method of timeline-based management of storage of media objects in accordance with some embodiments.

FIG. 6 is an example of a flow diagram of a method 600 of timeline-based management of storage of media objects in accordance with some embodiments. In some embodiments, the method 600 or portions thereof is performed by the cDVR system 306 in FIG. 3. In some embodiments, the method 600 or portions thereof are performed by an electronic device or an apparatus.

As represented by block 602, the method 600 includes storing, in a memory, a first plurality of media objects. Each of the first plurality of media objects includes a respective plurality of sequential media segments. The first plurality of media objects is correspondingly associated with a plurality of metadata objects.

As represented by block 604, the method 600 includes receiving a first recording request that is associated with a first one of the first plurality of media objects. As represented by block 606, in some embodiments, the method 600 includes identifying a first timeline based on a first one of the plurality of metadata objects. The first timeline temporally characterizes the first one of the first plurality of media objects. For example, in some embodiments, the first timeline is encoded in an MPEG-DASH (MPD), HLS format, or HSS format.

As represented by block 608, the method 600 includes updating a first one of the plurality of metadata objects corresponding to the first one of the first plurality of media objects in response to receiving the first recording request, and in order to include an indication of the first recording request. In some embodiments, the first one of the first plurality of media objects includes a first plurality of sequential media segments, and the first one of the plurality of metadata objects provides an indication of temporal relationships between the first plurality of sequential media segments. For example, in some embodiments, the first one of the first plurality of media objects corresponds to one of an MPD, HLS, or HSS object.

As represented by block 610, the method 600 includes identifying, based on the plurality of metadata objects, a portion of the first plurality of media objects that satisfies a deletion criterion. The first one of the plurality of metadata objects does not satisfy the deletion criterion based on the first recording request.

As represented by block 612, the method 600 includes removing, from the memory, the portion of the first plurality of media objects while maintaining the first one of the first plurality of media objects. For example, with reference to FIG. 4, between time 7:12-7:30 the cDVR system removes respective portions of the "Kids Show" media object and "Sitcom XYZ" media object, while maintaining storage of the "Cooking Show" media object because the "Cooking Show" media object is associated with the recording request 420. Moreover, as represented by block 614, the method 600 includes adding, to the memory, a second plurality of media objects for storage along with the first one of the first plurality of media objects. Continuing with the previous example, the cDVR system adds newly available media content corresponding to 7:12-7:30 of the "Hockey Game" media object to the memory 400.

As represented by block 616, in some embodiments, the method 600 includes receiving a second recording request that is associated with a first one of the second plurality of media object. For example, with reference to FIG. 4, the second recording request is associated with a portion of or the entirety of the "Hockey Game" media object.

As represented by block 618, in some embodiments, the method 600 includes identifying a second timeline based on the respective metadata object. The second timeline temporally characterizes the first one of the second plurality of media objects. For example, in some embodiments, the second timeline is encoded in an MPD, HLS, or HSS format.

As represented by block 620, in some embodiments, the method 600 includes updating a respective metadata object associated with the first one of the second plurality of media objects in response to receiving the second recording request. Continuing with the previous example, with reference to FIG. 4, the cDVR system updates a metadata object corresponding to the "Hockey Game" media object.

As represented by block 622, in some embodiments, the method 600 includes determining whether or not the first timeline and the second timeline satisfy a boundary condition with respect to each other. In some embodiments, the first timeline and the second timeline satisfy the boundary condition with respect to each other when the first and second timelines are contiguous with respect to each other. For example, the first timeline is 1:00-2:00 and the second timeline is 2:00-2:10 and growing as new available media content is received.

As represented by block 624, in some embodiments, the method 600 includes storing the first one of the plurality of metadata objects separately from the respective metadata object in response to determining that the first timeline and the second timeline do not satisfy the boundary condition with respect to each other. For example, in some embodiments, the method 600 includes storing the respective metadata object and the first one of the plurality of metadata objects in separate memory spaces, such as in different linear buffers.

As represented by block 626, in some embodiments, the method 600 includes storing the first one of the plurality of metadata objects in association with the respective metadata object in response to determining that the first timeline and the second timeline satisfy the boundary condition with respect to each other. For example, as represented by block 628, in some embodiments, storing the first one of the plurality of metadata objects in association with the respective metadata object includes concatenating the first and second metadata objects. As another example, as represented by block 630, in some embodiments, storing the first one of the plurality of metadata objects in association with the respective metadata object includes merging a common portion of the first and second metadata objects.

Figure 7:
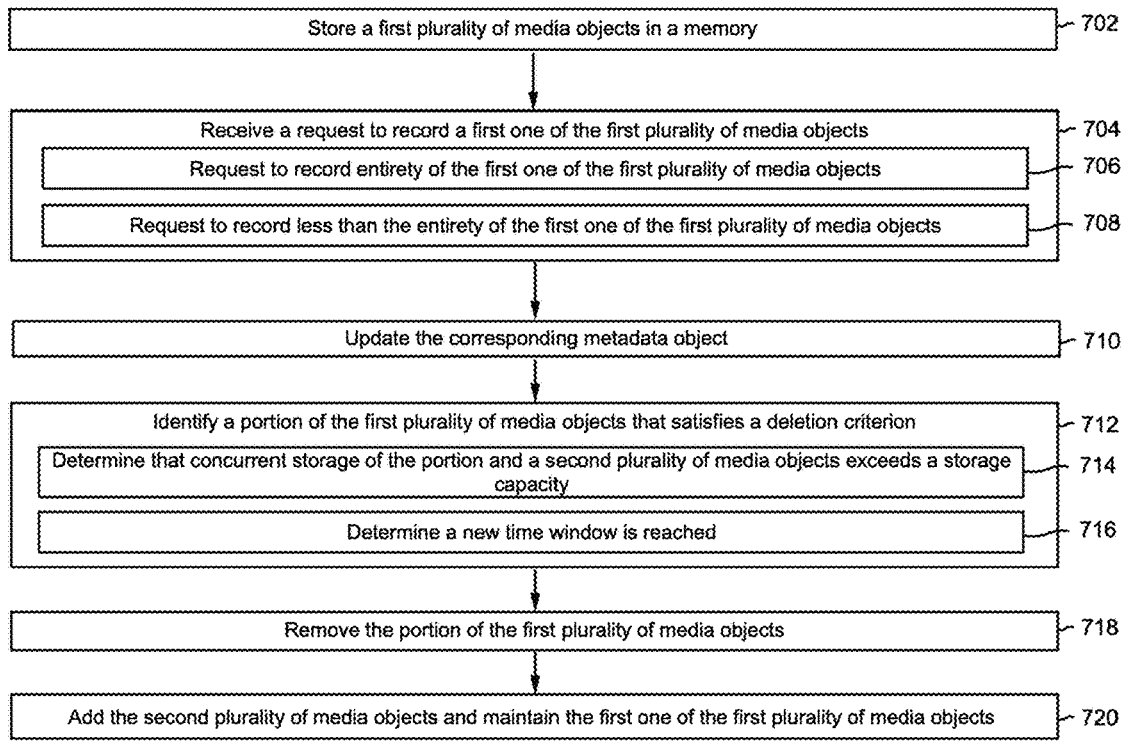
FIG. 7 is another example of a flow diagram of a method of managing storage of media objects in accordance with some embodiments.

FIG. 7 is another example of a flow diagram of a method 700 of managing storage of media objects in accordance with some embodiments. In some embodiments, the method 700 or portions thereof is performed by the cDVR system 306 in FIG. 3. In some embodiments, the method 700 or portions thereof are performed by an electronic device or an apparatus.

As represented by block 702, the method 700 includes storing, in a memory, a first plurality of media objects. Each of the first plurality of media objects includes a respective plurality of sequential media segments. The first plurality of media objects is correspondingly associated with a plurality of metadata objects.

As represented by block 704, the method 700 includes receiving a first recording request that is associated with a first one of the first plurality of media objects. For example, as represented by block 706, in some embodiments, the first recording request is associated with the entirety of the first one of the first plurality of media objects. Accordingly, maintaining the first one of the first plurality of media objects includes maintaining the entirety of the first one of the first plurality of media objects. As another example, as represented by block 708, in some embodiments, the first recording request is associated with a first portion of the first one of the first plurality of media objects that is less than the entirety of the first one of the first plurality of media objects. Accordingly, removing the portion of the first plurality of media objects includes removing a second portion of the first one of the first plurality of media objects that is not associated with the first recording request.

As represented by block 710, the method 700 includes updating a first one of the plurality of metadata objects corresponding to the first one of the first plurality of media objects in response to receiving the first recording request, and in order to include an indication of the first recording request.

As represented by block 712, the method 700 includes identifying, based on the plurality of metadata objects, a portion of the first plurality of media objects that satisfies a deletion criterion. The first one of the plurality of metadata objects does not satisfy the deletion criterion based on the first recording request. For example, in some embodiments, as represented by block 714, identifying the portion of the first plurality of media objects that satisfies the deletion criterion includes determining that concurrent storage, in the memory, of the portion of the first plurality of media objects and the second plurality of media objects exceeds a storage capacity associated with the memory. As another example, in some embodiments, as represented by block 716, the first plurality of media objects is associated with a first time window, and identifying the portion of the first plurality of media objects that satisfies the deletion criterion includes determining that the second plurality of media objects is associated with a second time window that different from the first time window. For example, the first time window is the first Monday of a February to the second Monday of February, and the second time window is the second Monday of February to the third Monday of February. As another example, the second time window and the first time window do not overlap each other.

As represented by block 718, the method 700 includes removing, from the memory, the portion of the first plurality of media objects while maintaining the first one of the first plurality of media objects. As represented by block 720, the method 700 includes adding, to the memory, a second plurality of media objects for storage along with the first one of the first plurality of media objects.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   storing, in a memory, a first plurality of media objects, wherein each of the first plurality of media objects includes a respective plurality of sequential media segments, and wherein the first plurality of media objects is correspondingly associated with a plurality of metadata objects;
   receiving a first recording request that is associated with a first one of the first plurality of media objects;
   updating a first one of the plurality of metadata objects corresponding to the first one of the first plurality of media objects in response to receiving the first recording request, and in order to include an indication of the first recording request;
   identifying, based on the plurality of metadata objects, a portion of the first plurality of media objects that satisfies a deletion criterion, wherein the first one of the plurality of metadata objects does not satisfy the deletion criterion based on the first recording request;
   removing, from the memory, the portion of the first plurality of media objects while maintaining the first one of the first plurality of media objects; and
   adding, to the memory, a second plurality of media objects for storage along with the first one of the first plurality of media objects.

2. The method of claim 1, wherein the first one of the first plurality of media objects includes a first plurality of sequential media segments, and wherein the first one of the plurality of metadata objects provides an indication of temporal relationships between the first plurality of sequential media segments.

3. The method of claim 1, wherein the memory corresponds to a rolling buffer.

4. The method of claim 1, further comprising:
   receiving a second recording request that is associated with a first one of the second plurality of media objects; and
   updating a respective metadata object associated with the first one of the second plurality of media objects in response to receiving the second recording request.

5. The method of claim 4, further comprising:
   identifying a first timeline based on the first one of the plurality of metadata objects, wherein the first timeline temporally characterizes the first one of the first plurality of media objects; and
   identifying a second timeline based on the respective metadata object, wherein the second timeline temporally characterizes the first one of the second plurality of media objects.

6. The method of claim 5, further comprising:
   determining whether or not the first timeline and the second timeline satisfy a boundary condition with respect to each other;
   storing the first one of the plurality of metadata objects in association with the respective metadata object in response to determining that the first timeline and the second timeline satisfy the boundary condition with respect to each other; and
   storing the first one of the plurality of metadata objects separately from the respective metadata object in response to determining that the first timeline and the second timeline do not satisfy the boundary condition with respect to each other.

7. The method of claim 6, wherein the first timeline and the second timeline satisfy the boundary condition with respect to each other when the first and second timelines are contiguous with respect to each other.

8. The method of claim 6, wherein storing the first one of the plurality of metadata objects in association with the respective metadata object includes concatenating the first and second pluralities of metadata objects.

9. The method of claim 6, wherein storing the first one of the plurality of metadata objects in association with the respective metadata object includes merging a common portion of the first and second pluralities of metadata objects.

10. The method of claim 1, wherein identifying the portion of the first plurality of media objects that satisfy the deletion criterion includes determining that concurrent storage, in the memory, of the portion of the first plurality of media objects and the second plurality of media objects exceeds a storage capacity associated with the memory.

11. The method of claim 1, wherein the first plurality of media objects is associated with a first time window, and wherein identifying the portion of the first plurality of media objects that satisfy the deletion criterion includes determining that the second plurality of media objects is associated with a second time window that different from the first time window.

12. The method of claim 1, wherein the first recording request is associated with a first portion of the first one of the first plurality of media objects that is less than the entirety of the first one of the first plurality of media objects, and wherein removing the portion of the first plurality of media objects includes removing a second portion of the first one of the first plurality of media objects that is not associated with the first recording request.

13. The method of claim 1, wherein the first recording request is associated with the entirety of the first one of the first plurality of media objects, and wherein maintaining the first one of the first plurality of media objects includes maintaining the entirety of the first one of the first plurality of media objects.

14. The method of claim 1, wherein the first recording request and the first plurality of media objects are associated with a common source identifier.

15. A cloud digital video recorder (cDVR) system comprising:
   one or more processors; and
   a non-transitory computer-readable medium including instructions, which, when executed, cause the one or more processors to perform operations including:
      storing, in a memory, a first plurality of media objects, wherein each of the first plurality of media objects includes a respective plurality of sequential media segments, and wherein the first plurality of media objects is correspondingly associated with a plurality of metadata objects;
      receiving a first recording request that is associated with a first one of the first plurality of media objects;
      updating a first one of the plurality of metadata objects corresponding to the first one of the first plurality of media objects in response to receiving the first recording request, and in order to include an indication of the first recording request;
      identifying, based on the plurality of metadata objects, a portion of the first plurality of media objects that satisfies a deletion criterion, wherein the first one of the plurality of metadata objects does not satisfy the deletion criterion based on the first recording request;

removing, from the memory, the portion of the first plurality of media objects while maintaining the first one of the first plurality of media objects; and adding, to the memory, a second plurality of media objects for storage along with the first one of the first plurality of media objects.

16. The cDVR system of claim 15, wherein the instructions cause the one or more processors to perform operations including:

receiving a second recording request that is associated with a first one of the second plurality of media objects; and updating a respective metadata object associated with the first one of the second plurality of media objects in response to receiving the second recording request.

17. The cDVR system of claim 15, wherein the instructions cause the one or more processors to perform operations including:

identifying a first timeline based on the first one of the plurality of metadata objects, wherein the first timeline temporally characterizes the first one of the first plurality of media objects; and identifying a second timeline based on the respective metadata object, wherein the second timeline temporally characterizes the first one of the second plurality of media objects.

18. The cDVR system of claim 17, wherein the instructions cause the one or more processors to perform operations including:

determining whether or not the first timeline and the second timeline satisfy a boundary condition with respect to each other;

storing the first one of the plurality of metadata objects in association with the respective metadata object in response to determining that the first timeline and the second timeline satisfy the boundary condition with respect to each other; and storing the first one of the plurality of metadata objects separately from the respective metadata object in response to determining that the first timeline and the second timeline do not satisfy the boundary condition with respect to each other.

19. The cDVR system of claim 15, wherein the first one of the first plurality of media objects includes a first plurality of sequential media segments, and wherein the first one of the plurality of metadata objects provides an indication of temporal relationships between the first plurality of sequential media segments.

20. A non-transitory computer-readable medium including instructions, which, when executed by an electronic device including one or more processors, cause the electronic device to:

store, in a memory, a first plurality of media objects, wherein each of the first plurality of media objects includes a respective plurality of sequential media segments, and wherein the first plurality of media objects is correspondingly associated with a plurality of metadata objects;

receive a first recording request that is associated with a first one of the first plurality of media objects;

update a first one of the plurality of metadata objects corresponding to the first one of the first plurality of media objects in response to receiving the first recording request, and in order to include an indication of the first recording request;

identify, based on the plurality of metadata objects, a portion of the first plurality of media objects that satisfies a deletion criterion, wherein the first one of the plurality of metadata objects does not satisfy the deletion criterion based on the first recording request;

remove, from the memory, the portion of the first plurality of media objects while maintaining the first one of the first plurality of media objects; and add, to the memory, a second plurality of media objects for storage along with the first one of the first plurality of media objects.

\* \* \* \* \*